Jan. 10, 1950
J. R. MOORE
2,493,774
RADIO OBJECT LOCATING SYSTEM
Filed May 11, 1943
3 Sheets-Sheet 2
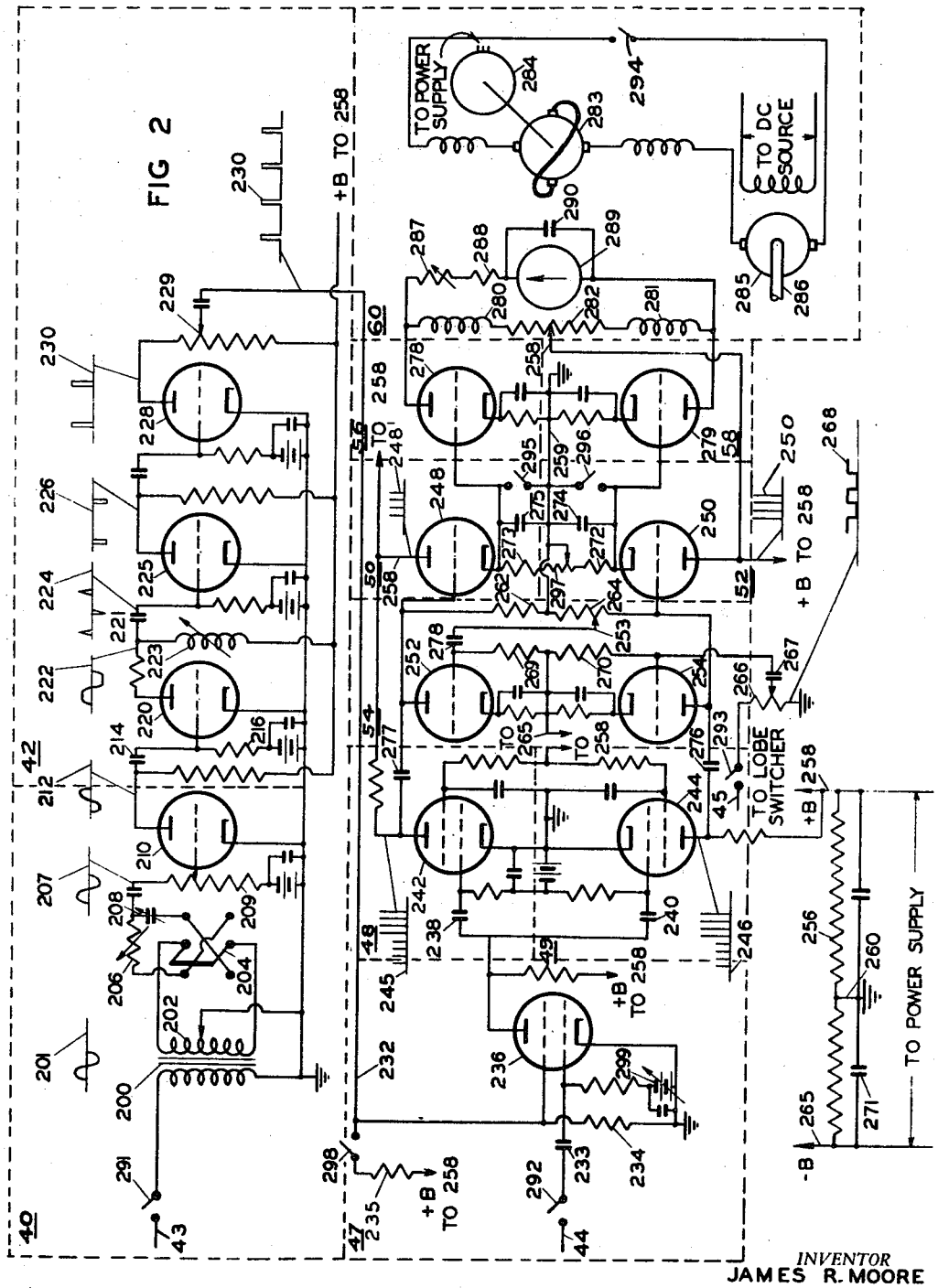
INVENTOR
JAMES R. MOORE
BY
*William D. Hall*
ATTORNEY Jan. 10, 1950  J. R. MOORE  2,493,774
RADIO OBJECT LOCATING SYSTEM
Filed May 11, 1943  3 Sheets-Sheet 3
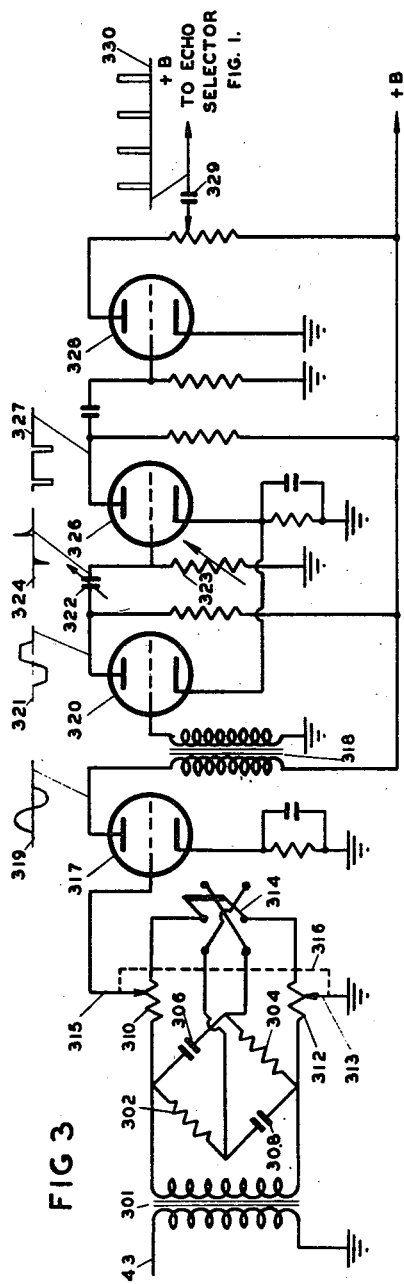
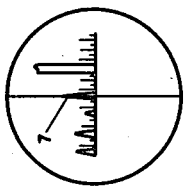
FIG 6
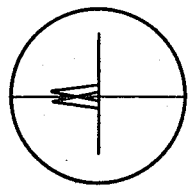
FIG 8
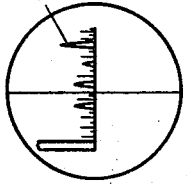
FIG 5
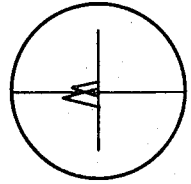
FIG 7
INVENTOR
JAMES R. MOORE
BY William E. Hall
ATTORNEY Patented Jan. 10, 1950

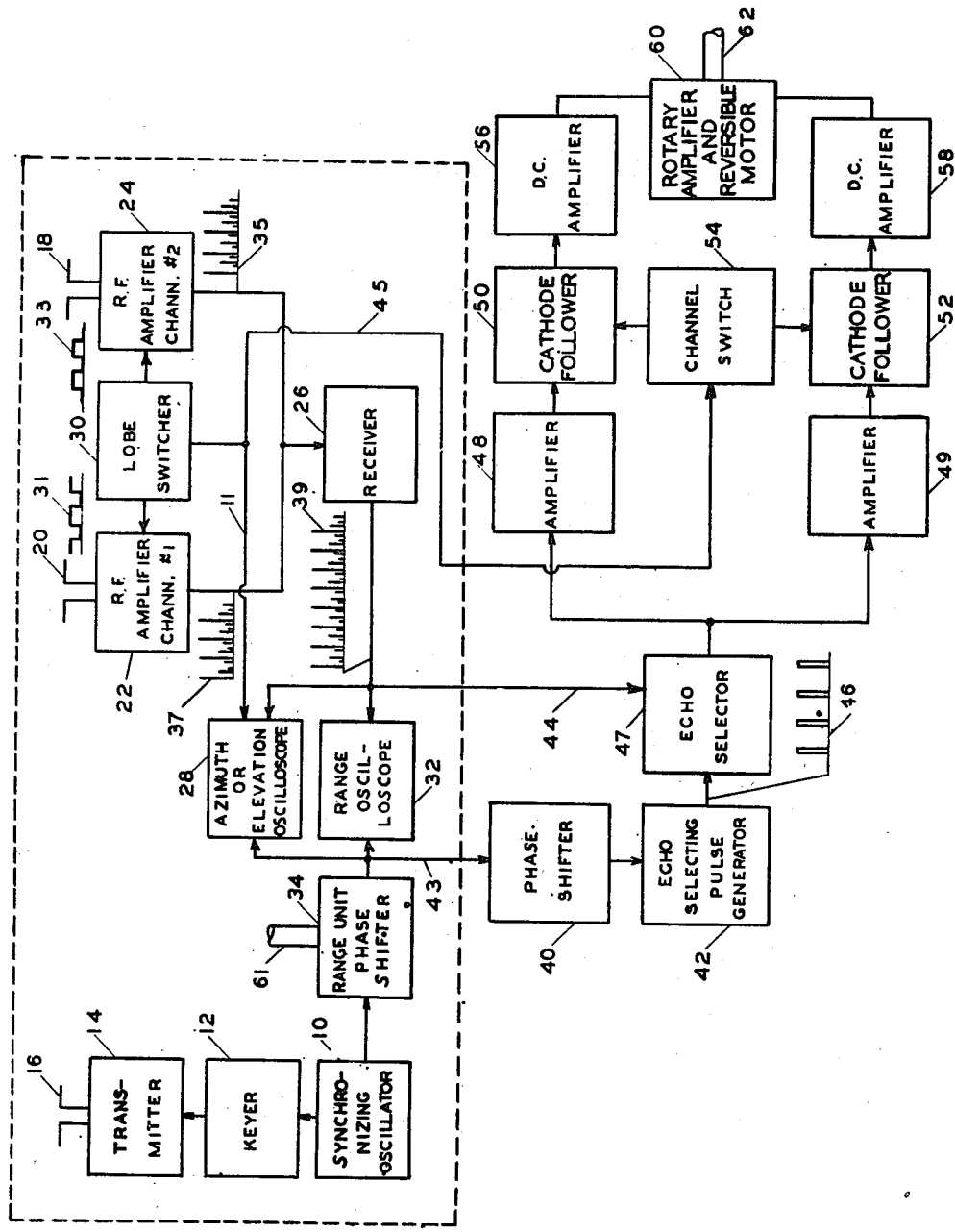

2,493,774

UNITED STATES PATENT OFFICE 2,493,774

RADIO OBJECT LOCATING SYSTEM

James R. Moore, Dutch Neck, N. J.

Application May 11, 1943, Serial No. 486,531

6 Claims. (Cl. 343—13)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to radio pulse-echo object-locating systems, and more particularly to systems for automatically tracking with elevation and azimuth antenna arrays a single echo-producing object.

In systems of this type, a pulse of radio-frequency energy is radiated by a highly directional antenna. If the transmitted wave strikes an object capable of reradiating these waves, they will be reflected, in part, back to their source by this object. This echo pulse on its return to its source has sufficient energy to produce an observable effect in a suitable receiver located in the vicinity of the original source of these pulses. Generally the effect consists of visual indications on a cathode-ray oscilloscope in a form of vertical peaks projecting upward from a horizontal baseline. These visual indications, together with the positioning of the antennae, are utilized for determining the location of the object.

Under certain conditions a complete reliance on the data as obtained by the operators of the radio systems of this type, based on manual adjustments of controls for manual tracking with elevation and azimuth antenna arrays, unjustifiably limits the possibility of these systems by lowering their accuracy. The vertical peaks produced by the echo signals may vary in their amplitude from one instant to another because of the fluctuations in the intensity of the reflected signal, interference signals which may add to or subtract from the echo signals, variations in the transmission medium and the resulting variations in strength of the reflected pulse, and other causes which need not be discussed here. Moreover, the signal pattern as it actually appears on the oscilloscope screen generally includes a large number of echo signals proper as well as a multitude of pulsating signals, commonly called "noise." Another factor which must be considered relates to the illumination generally found on the oscilloscope screen. Compared with daylight, this illumination is low, and when the equipment is used in the daytime there is a very marked contrast in light intensities found on the oscilloscope screen and bright surroundings. This contrast sometimes produces a temporary blindness among operators due to quick changes from light to dark and vice versa.

All of these effects tend to tire the operators, strain their eyes, and make them non-responsive to small changes in the intensities of the echo signals on the oscilloscope screen. This, added to the normal human error which increases very rapidly under combat conditions, causes the operators to make relatively large errors in azimuth and elevation determinations. Since these errors are attributable solely to the manual operation of the system, no advantage is obtained by increasing the accuracy of the radio system itself because high precision of the system itself is completely submerged in the comparatively large errors committed by the operators during manual operation of the controls. Therefore, if the increased precision of the radio system itself is to be reflected in the final data obtained with the aid of this system, the errors produced by the operators must be eliminated. The most direct method of accomplishing this result is by eliminating this source of errors altogether. This may be done by transferring some of the duties of the operators at a predetermined stage of a normal operating cycle of the radio locator to an automatic equipment, the performance of which would excel the manual operation of controls by the operators, and would thus enable one to obtain that limit of accuracy which is imposed only by the system itself.

It is, therefore, the principal object of this invention to provide a motor driven equipment for automatic antenna tracking of an echo signal selected by the operator.

Another object of this invention is to provide a meter tracker for a radio pulse-echo object-locating system which gives the operator an even flow of data on the relative position of a single echo producing object. An additional object of this invention is to provide an automatic antenna tracker which selects a desired echo signal, and separates the channel components of the selected echo signal, by means of electronic devices.

Still another object of my invention is to provide an electronic automatic tracker, synchronous operation of which is determined by a synchronizing oscillator used for operating the transmitter and the receiver of a radio object-locating system. A further object of my invention is to provide an automatic tracker for a double-tracking radio object-locating system, said automatic tracker utilizing the difference in the amplitude of the channel components of the selected echo signal for generating reversible-direct currents which are proportional to said difference.

The novel features which I believe to be characteristic of my invention are set forth with particularity in the appended claims. My invention itself, however, both as to its organization and method of operation, together with further objects and advantages thereof, may best be understood by reference to the following description taken in connection with the accompanying drawings in which:

Figure 1 is a block diagram of a double-tracking radio object-locating system, and a block diagram of an automatic tracker connected to said system.

Figure 2 is a schematic circuit diagram of a meter tracker.

Figure 3 is a schematic circuit diagram of a modified form of an echo selecting pulse generator.

Figure 4 is a schematic circuit diagram of a modified form of connections between an automatic tracker and a power drive for an antenna array mount.

Figures 5 and 6 illustrate the signal pattern on the screen of the range oscilloscope, and, Figures 7 and 8 illustrate the signal pattern of the selected echo signal on the screen of the azimuth and elevation oscilloscope screens.

Classification of the radio object-locating systems

Before proceeding with the description of the specific automatic tracking system disclosed in this application, for the sake of clarity of the disclosure, a broad present-day classification of radio object-locating systems will be given first. This will be followed by a description of the particular radio object-locating system to which the automatic tracker is connected, the two being adapted to function as a single operating unit when tracking of a moving object is transferred to the automatic tracker. The two broad classes of the radio object-locating systems are as follows: One class uses a single synchronizing oscillator for operating the transmitting and the receiving channels, this oscillator keeping the two channels constantly in the strictest synchronism. In the second class of systems, the transmitter is keyed by the so-called spark keyer, there being no synchronizing oscillator in the system, and the receiving channel is kept in synchronism with the transmitter through the use of "servo-sweep" or "slave-sweep" circuits. In the latter system the transmitted signal is used to operate the "servo-sweep" circuit of the oscilloscope, and therefore it is the transmitted signal itself that is used for operating the receiving channel in synchronism with the transmitting channel. This invention relates to the first class of radio object-locating systems using a synchronizing oscillator.

In the radio object-locating system under consideration, echo signals are received over an antenna array having two divergent, partially overlapping-response lobes, one of these lobes being connected to one receiver channel, and another lobe being connected to the other receiving channel, these channels being keyed by a lobe switcher so that there is first a series of echo signals as they are received over one antenna lobe and one receiver channel, and then a series of echo signals of like duration as they are received over the other antenna lobe and the other receiver channel. If the antenna is properly oriented with respect to any given object, the intensity of the echo signals produced by this object in the two channels will be equal. This is true with respect to the azimuth as well as the elevation channels since both channels utilize the principles outlined above. Therefore, the automatic tracking system which is suitable for the azimuth tracking is equally suitable for the automatic tracking in elevation. This being the case, a description of only one system is necessary.

The radio object-locating systems which employ an antenna array with two divergent, overlapping response lobes, and a like number of receiver input channels connected to the output circuits of the antenna lobes alternately operating to receive a series of signals from an object first through one of said channels and then through the other, and which use these channel signals to provide two adjacent visual signals which may be easily compared with respect to the relative magnitude, and thus used for the purpose of orientation of the system in azimuth and in elevation, are known as the double-tracking systems. This is shown in Figs. 7 and 8 where the two channel components of an echo signal produced by a single object are shown as they normally appear on the screens of the azimuth and elevation oscilloscopes.

Apparatus for automatic tracking described in this specification, besides being particularly adapted to function with radio object-locating systems utilizing a synchronizing oscillator, is also particularly adapted for use in connection with double-tracking radio systems which produce, as outlined heretofore, two independent series of channel components of a single echo signal.

In order to automatically track a single moving object with systems of this type the automatic tracker must satisfy the following requirements: The first requirement for the automatic tracker resides in the provision of some means for the selection of the desired echo signal and elimination of all other signals which may be present in the output circuits of the receiver. Since, as a rule, there is a plurality of objects producing an echo signal within the field of the antenna, and since the receiving antenna also receives the transmitted signal, it then follows that in order to automatically track a single moving object, it is necessary to eliminate the transmitted signal and all other echo signals from the output circuits of the automatic tracker to accomplish the desired result.

The second requirement for the automatic tracker used with a double-tracking system resides in the provision of a circuit capable of separating the channel components of the selected echo signal so that the channel No. 1 components appear once more in an independent circuit, and the channel No. 2 components appear in the other independent circuit. This is necessary so that the channel components of the selected echo signal may be impressed, after proper linear amplification, on a differential circuit capable of comparing the amplitude of the channel components of the selected echo signal.

The third requirement for the automatic tracker suggests itself at once from what has been said about the second requirement. The parallel channels of the automatic tracker must terminate in a differential circuit which would be capable of comparing the amplitude of the channel components, this comparison resulting in a reversible-direct current proportional to the difference in the amplitude of the channel components.

Finally the automatic tracker must provide a power amplifier terminating in a power-driven mechanism connected to the antenna array mount, the power drive being capable of responding to the reversible-direct current voltage of the amplifier to automatically turn the antenna mount in the direction which would equalize the intensities of the channel components of the selected echo signal.

The automatic tracking system described in this specification has elements which satisfy the enumerated requirements.

*Double-tracking radio object-locating system with synchronizing oscillator.*

Figure 1 shows that type of radio object-locating system which uses a double-tracking antenna array, and a synchronizing oscillator.

A synchronizing oscillator 10, appearing in the lower left portion of the block diagram, is connected to a keyer 12 which modifies the sinusoidal wave impressed upon it into a periodic series of powerful pulses of very short duration. These pulses are used for keying a transmitter 14 which emits correspondingly short, powerful and highly directional pulses through a highly directional antenna array 16. If there are any objects within the field of antenna 16 that are capable of reradiating the transmitted pulse, the transmitted pulse will be reradiated by these objects, and some portion of the reradiated energy will reach an antenna array 18—20. This array has two divergent, partially overlapping highly directional reception patterns so that the reflected echo signal will induce two signals of equal intensity when the mean axis of the array is pointed directly at the object, and of unequal intensity when the array forms an angle with the plane of the incoming radio wave.

The antenna arrays of this type are known, and do not form a part of my invention. Therefore, their description need not be given here. It should be stated, however, that my invention is not restricted to any particular antenna system, and will function with any type of directional antenna array which has at least two divergent, partially overlapping reception patterns capable of producing two signals of equal or unequal intensity, depending upon the orientation of the array with respect to the plane of the incoming radio wave.

The object locating system shown in Fig. 1 is used for determining the azimuth, elevation and range of the object. As the azimuth and the elevation channels are identical, only one of them is shown in Fig. 1. The range determining channel, as a rule, has no separate antenna array, and may be connected either to the azimuth or elevation channel.

A signal from one lobe of the antenna is impressed on a radio frequency amplifier 22, and from the other lobe on an amplifier 24, the two amplifiers forming two parallel input channels of the receiver. The signals in these radio frequency channels will be composed of the main transmitted pulse, one or more echo signals, if there are any echo-producing objects within the antenna field, and of interference signals. This is illustrated in Fig. 5 which shows a range oscilloscope screen with a typical signal pattern appearing on the screen.

As stated above, the amplitude of the echo signals in these channels may or may not be equal, and this amplitude difference is utilized as a guide for proper orientation of the azimuth and elevation antenna arrays. A typical single-echo signal pattern as it appears on the elevation or azimuth oscilloscope screens is illustrated in Figs. 7 and 8. Normally, all signals appearing on the screen of the range oscilloscope also appear in the same phase relationship on the oscilloscope screens of the azimuth and the elevation channels; for the sake of clarity only one selected echo signal is illustrated in Figs. 7 and 8. Fig. 7 illustrates when the channel components have unequal intensities, and Fig. 8 illustrates them when they are made equal by pointing the antenna array directly at the echo-producing object.

To produce these two independent images of the same echo signal on the screen of an azimuth oscilloscope 28, amplifiers 22 and 24 are keyed by a lobe switcher 30 which generates rectangular waves 31 and 33 of the same frequency but 180° out of phase; these waves make amplifiers 22 and 24 alternately conductive so that the output signals of the amplifiers are as illustrated at 35 and 37, the highest peaks indicating the transmitted pulse, and the smaller peaks indicating the echoes.

The lobe switcher frequency may be sychronized by well known means with the frequency of the synchronizing oscillator 10, and made either equal or a sub-multiple of one-half the oscillator's frequency. If the lobe switcher frequency does not have any sub-multiple or multiple relationship with one-half the frequency of the oscillator, then it must be sufficiently removed from the frequency of the oscillator to avoid the production of undesired patterns on the oscilloscope screens. In the system shown in Fig. 1 the frequency of the lobe switcher is one-fourth the frequency of the oscillator, since four complete channel components of revised signals are shown at 35 and 37.

A receiver 26 is connected to the amplifiers 22, 24 on its input side, and to the oscilloscopes 28 and 32 on its output side. The oscilloscope 28 may be either an azimuth or an elevation oscilloscope depending upon whether antenna 18—20 is an azimuth or elevation antenna. To avoid confusion and repetition, oscilloscope 28 will be referred to in this specification as an azimuth oscilloscope. The signals on the output side of the receiver are shown at 39; they consist of four signals first from one lobe and then the other lobe. The sweep voltages of the oscilloscopes 28 and 32 are under control of the synchonizing oscillator 10 to which they are connected through a range unit phase shifter 34. Moreover, the sweep circuit of oscilloscope 28 is also modified by a square wave 31 generated by the lobe switcher, this oscilloscope being connected to lobe switcher 30 over conductor 11. Since the synchronizing oscillator 10 also controls keyer 12 and transmitter 14, the sweep circuits of the oscilloscopes 28 and 32 are in constant synchronism with the transmitted pulses. The square wave 31 is utilized in the sweep circuit of oscilloscope 28 for lateral shifting of the cathode-ray beam in synchronism with the lobe switching of the R. F. channels 22—24. Therefore, the signals shown at 39 in Fig. 1 appear as two laterally displaced images on the screen of the azimuth oscilloscope 28, as illustrated in Figs. 7 and 8, the degree of lateral displacement being controlled by varying the amplitude of square wave 31. When the antenna is not pointed at the object, then the two signals appear in phase, but have different amplitudes.

Since range oscilloscope 32 is not connected to lobe switcher 30, its sweep circuit is controlled only by the synchronizing oscillator 10, and, as a consequence, there is no lateral displacement of the signals on its screen, but they appear as a single retraced signal when the antenna is pointed directly at the object. This is illustrated in Figs. 5 and 6.

The operation of the system is, briefly as follows: Oscillator 10 controls keyer 12 in such a manner that the latter keys transmitter 14 with a constant predetermined periodicity, this periodicity being controlled by the frequency of the oscillator. Transmitter 14 emits through a highly directional antenna array 16 short periodic pulses which constitute the field exploring signals. If there is a plurality of echo-producing objects within the antenna field, their echoes will appear on the range, azimuth, and elevation oscilloscopes as a plurality of peaked signals. To determine the distance to any one of these objects, the range oscilloscope operator revolves a hand wheel of the phase shifter 34 until the selected echo signal appears under the hairline of the range oscilloscope 32, as illustrated in Figs. 5 and 6, where Fig. 5 illustrates the relative position of the signals with respect to the hair line before any echo signal has been selected, and Fig. 6 illustrates the same signals but with the echo signal 7 selected by the range oscilloscope operator. The phase shifter has a correctly calibrated dial which gives a range distance in miles or yards, its reading being zero when the transmitted pulse is under the cross hair line on the screen of the range oscilloscope. Operation of phase shifter 34 also shifts the echo signals on the screens of the elevation and azimuth oscilloscopes, and positions the echo signal selected by the range operator in the center of the screens of these oscilloscopes, as illustrated in Figs. 7 and 8. This at once gives notice to the azimuth and elevation operators which particular signal has been selected, and that they must properly orient their antennae with respect to that particular echo signal. If the echo signals are of different magnitude, as illustrated in Fig. 7, the azimuth and elevation operators turn the antenna mounts either manually or through power drives so as to point their antennae directly at the object. This equalizes the amplitudes of the echo components on the oscilloscope screens, as illustrated in Fig. 8. The azimuth and elevation angles necessary for locating the object appear on the dials connected to the antenna mounts.

The automatic tracker described in the specification replaces the manual orientation of the antenna mounts with the automatic system which follows a moving object with the azimuth and elevation antenna without any manual assistance.

*General description of the automatic tracker*

Apparatus for automatic tracking utilizes the double tracking principle of operation of the system for obtaining reversible-direct currents which are used for proper orientation of the azimuth and elevation antenna arrays. As mentioned previously in this disclosure, the echo signals are received over the antenna array having two divergent, partially overlapping response lobes, one of these lobes being connected to one receiver channel, and another lobe being connected to the other receiver channel, the receiver being keyed by the lobe switcher so that there is first a series of echo signals as received over one antenna lobe, and then a series of like duration of echo signals received over the other antenna lobe. If the antenna is properly oriented with respect to any given object the intensities of the echo signals produced by this object in the two channels will be equal. However, if the antenna deviates from the plane of the incoming echo signal, the channel components become unequal.

The automatic tracker utilizes this inequality in the amplitude of the channel components of the desired echo signal for keeping the antenna constantly pointed directly at a target. In order to accomplish this result, the automatic tracker selects that same signal which has been selected by the range operator, and suppresses the transmitted signal, and all other echo signals, if there are any. The selected echo signal is then impressed on two parallel amplifier channels where it is amplified. It is then impressed in an amplified form on an electronic switch which is connected on one side to the output of the above mentioned amplifiers and on the other side to the lobe switcher which is used for keying the lobe channels of the receiver. The last connection renders the electronic switch alternately conductive in synchronism with the lobe switching of the receiver so that the channel components of the selected echo signal are again separated and the signals derived through one lobe appear as a series of control grid signals in one amplifier tube, while the components derived through the other lobe appear as a series of control grid signals on the other amplifier tube, these amplifiers forming a part of the electronic switch on their input side, and the beginning of the differential amplitude comparison circuit on their output side. The output of the amplifiers is impressed on the grids of direct current amplifiers composed of two vacuum tubes, the plates of which are connected to differential field windings of a rotary amplifier. When the channel components of the selected echo signal have an equal amplitude then the currents traversing the field windings of the amplifier are equal, and the flux produced by one winding is neutralized by the flux produced by the other winding so that there is no voltage generated by the amplifier. This is the case when the antenna is properly oriented with respect to the object producing the selected echo signal. However, if the antenna deviates from the plane of the electromagnetic wave of the incoming echo signal, the channel components of the selected echo signal become unequal, and this inequality produces a proportionally amplified inequality in the fluxes generated by the two field windings so that there is now a resultant flux which generates a direct current voltage in the rotary amplifier. This voltage is impressed on a reversible-direct current motor, the driving shaft of which is connected to the antenna mount. The reversal in voltage generated by the amplifier reverses the rotation of the direct current motor, and this reversal in rotation is transmitted to the antenna array mount. This results in the automatic turning of the antenna mount in such a direction as to equalize the echo signals in the two channels of the receiver and the two channels of the automatic tracker.

Referring to Fig. 1 once more, the automatic tracker is connected to the double-tracking radio object-locating system previously described over conductors 43, 44 and 45. Synchronizing oscillator 10 is connected through phase shifter 34 to a second phase shifter 40 over conductor 43, phase shifter 40 being used for cophasing the automatic tracker with receiver 26. The sinusoidal wave generated by synchronizing oscillator 10 is thus impressed in proper phase relationship on an echo selecting pulse generator 42 which transforms it into a rectangular wave shown at 46. The duration of each rectangular element of this wave may be somewhat longer or equal to the duration of the individual echo signal. Rectangular wave 46 is impressed on an echo selector 47, which is also connected to the output of receiver 26 over conductor 44. Echo selector 47 may comprise a tetrode, the control grid of which is connected to the receiver, and the screen grid of which is connected to the echo selecting pulse generator. The tetrode is normally non-conductive so that the signals impressed upon it by the receiver cannot appear in its output circuit unless they coincide in time with the rectangular pulse 46. Since the rectangular pulse 46 coincides in time with the echo signal selected by the operator of the range oscilloscope because of the initial cophasing of the systems by means of phase shifter 40, the same echo signal will be also selected by echo selector 47. The selected echo signal is impressed on amplifiers 48 and 49, where it is amplified and impressed on the cathode followers 50 and 52. Followers 50 and 52 are connected to a channel switch 54, the latter being in turn connected to lobe switcher 30 over conductor 45. Channel switch 54 and followers 50 and 52 comprise an electronic switch which alternately removes the blocking potential from one follower and impresses a blocking potential on the other follower in synchronism and in phase with the appearance of the channel components of the selected echo signal in these followers. A separation of the channel components of the selected echo signal takes place with the result that a direct current amplifier 56 connected to follower 50 receives the channel component signals from one antenna lobe, and direct current amplifier 58 connected to follower 52 receives the channel component signals from the other antenna lobe. The direct current amplifiers are connected to a rotary amplifier 60 which generates a voltage proportional to the difference in the amplitude of the channel component signals. This voltage is impressed on a reversible-direct current motor, the latter being utilized for proper orientation of the antenna array connected to the receiver. The direct current motor shaft 62 is connected to the azimuth antenna mount.

*Description of the schematic diagram, Figure 2*

Referring now to the schematic diagram of the automatic tracker, Fig. 2, the lower channel in Fig. 2 shows the echo selector at 236, the amplifiers at 242 and 244, the electronic switch which separates the channel components of the selected echo signal at 252, 254, 248, and 250; the direct current amplifiers connected to the electronic switch at 278 and 279, and the rotary amplifier connected to the output circuit of the direct current amplifier at 283. The upper channel in Fig. 2 shows the phase shifter, and the echo selecting pulse generator. The three conductors which connect the automatic tracker to the radio system are also shown in Fig. 2, conductor 43 interconnecting range unit 34 and phase shifter 40, Fig. 1, appearing in the upper left corner of Fig. 2, conductor 44 interconnecting receiver with the echo selector 236 appearing to the left of the lower channel, and conductor 45 interconnecting lobe switcher 30 with the channel switch 252—254 appearing in the central lower portion of Fig. 2.

Referring now particularly to the upper channel, phase shifter 40, Fig. 1, is shown in Fig. 2 as a transformer 200, with a center-tapped secondary 202, a double-pole double-throw switch 204, a variable resistor 206, and a variable condenser 208. The primary winding of transformer 200 is grounded on one side, and is connected to conductor 43 through a switch 291 on the other side, the latter connecting the echo selecting pulse generator to the output of phase shifter 34 in the range unit. The sinusoidal wave impressed on transformer 200 is illustrated at 201. Phase shifter 206—208 and the double-pole, double-throw switch 204 are used for the initial cophasing of the automatic tracker with the receiver. The double-pole double-throw switch is used for reversing the connections between the secondary 202 and condenser-resistance combination 206—208. By varying resistance 206 and condenser 208, it is possible to obtain a phase shift in a sinusoidal wave 201 in the order of 170°, and by reversing switch 210 it is possible to shift this variable phase by 180°. The phase shifter is connected through an adjustable potentiometer 209 to a linear amplifier 210, which is so biased as to operate as a class-A amplifier of the sinusoidal wave 207 impressed on its grid. Sinusoidal wave output 212 of amplifier 210 is impressed on the grid of an overdriven amplifier 220 over condenser 214 and grid resistor 216. The grid signal 212 overdrives amplifier 220 so that the sinusoidal wave is distorted in the output of this amplifier, and assumes a shape illustrated at 222. The degree of the overdrive determines the slopes of the signal shown at 222, and it may be varied by varying the potentiometer setting at 209. This wave is impressed on a condenser 221 and an inductance 223, this inductance-condenser combination having such constants as to transform wave 222 into a voltage wave illustrated at 224. This wave is amplified by a class-C overdriven amplifier 225. The intensity of the positive half of signal 224 impressed on the control grid of amplifier 225 is so adjusted that it overdrives this tube; therefore, the positive peak illustrated at 224 is transformed into a rectangular voltage pulse illustrated at 226. This pulse is impressed on a normally conductive class-A power amplifier tube 228 which inverts rectangular pulse 226 so that it appears as a positive rectangular voltage pulse 230 in the plate circuit of tube 228.

From the above description of the echo selecting pulse generator it follows that the sinusoidal wave 201 impressed on transformer 200 by synchronizing oscillator 10 is transformed into a series of rectangular pulses 230, a single rectangular pulse taking place per each complete cycle of the sinusoidal wave. The timing phase of the rectangular pulse 230 with respect to the sinusoidal wave 201 is made adjustable by providing the phase shifter in the input circuit of the echo selecting pulse generator, and the width of this pulse may be adjusted by varying the setting of potentiometer resistance 209. Normally, the width of this pulse should be wider than the width of an average echo pulse.

The rectangular pulse 230 is impressed over conductor 232 on a grounded resistance 234 connected to the screen grid of the echo selector tetrode 236, pulse 230 acting as an operating screen grid voltage for tetrode 236. The control grid of tetrode 236 is connected to receiver 20 over conductor 44, switch 292, and a condenser 233. The biasing potential 299 of this tetrode is adjusted to the cut-off value when the screen grid voltage 230 is impressed on the screen grid so that all signals, except the desired echo signal, are blocked, and have no effect on the output circuit of tetrode 236. When the rectangular pulse 230 impressed on the screen grid coincides in time with an echo pulse impressed on the control grid, tetrode 236 is rendered conductive. Since the echo selecting pulse generator 42, Fig. 1, is so phased with respect to the radio object-locating system that the desired echo signal and the rectangular pulse 230 are impressed simultaneously on tetrode 236, it follows that tetrode 236 will select the same echo signal which is selected by the range operator. Therefore, whenever the range operator selects an echo signal on the range oscilloscope, he automatically selects the same echo signal for the automatic tracker at tetrode 236.

The selected echo signal is impressed over condensers 238 and 240 on the control grids of tetrodes 242 and 244, where linear amplification of the desired echo signal takes place. The voltage signals as they appear in the plate circuits of tetrodes 242 and 244 are illustrated at 245 and 246. They represent a series of positive voltage signals of the selected echo signal. Both channel components appear in the output circuits of tetrodes 242 and 244. These signals are impressed on the control grids of followers 248 and 250, the conductivities of which are regulated by the grid bias potentials impressed upon them by triodes 252 and 254.

Tubes 248, 250, 252, and 254 comprise an electronic switch which is capable of separating the channel components of the selected echo signal so that the components from one channel appear in the output circuit of follower 248, and the components of the other channel appear in the output circuit of follower 250. The method of separating the channel components is described below. The connections to a source of plate potential illustrated diagrammatically as a bleeder resistor 256 shown at the bottom of Fig. 2 are as follows: The plates of the followers 248 and 250 are connected over conductor 258 to the positive terminal of bleeder resistor 256. The cathodes of the same followers are grounded over a conductor 259, which connects them to a ground 260 connected to an intermediate point on bleeder resistor 256. Conductor 259 also connects this intermediate point on the bleeder resistor to the plates of triodes 252 and 254 over resistors 262 and 264. The cathodes of triodes 252 and 254 are connected to the negative end of bleeder resistor 256 over conductor 265. The cathodes of triodes 252 and 254 are, therefore, below the ground potential 260, and the plates of these triodes are at ground potential. The grids of triodes 252 and 254 are connected to the cathodes through grid resistors 269 and 270 so that triodes 252 and 254 are normally conductive. The square wave voltage generated by lobe switcher 30, Fig. 1, and illustrated at 268 is impressed on the control grid of triode 254 over conductor 45 and resistor condenser combination 266 and 267. The alternating current circuit of condenser 267 is as follows: grounded resistance 266, condenser 267, grid resistor 270, conductor 265, and grounded condenser 271. When the positive rectangular wave 268 is impressed on resistance 266, the control grid of triode 254 is rendered positive because of the current flow in resistor 270. The conductivity of triode 254 is increased, and the flow of the plate current over resistor 264 is increased so that the plate of triode 254, and likewise the grid of follower 250, assume a lower potential with respect to ground. Since the cathode of follower 250 is connected to ground also over resistors 272 and 297, when triode 254 is rendered conductive, and a large current flows in resistor 264, lowering of the grid potential on the grid of follower 250 renders it non-conductive for the duration of the rectangular wave 268; the control grid of follower 250 is also connected to the output circuit of amplifier 244 over condenser 276. The circuit is so adjusted that lowering of the grid potential of follower 250 because of the increase in plate current of triode 254 is such that the signals impressed on the control grid of follower 250 from amplifier 244 do not have sufficiently high amplitude to overcome the created blocking potential. Therefore, at this time the lower channel of the automatic tracker becomes blocked at follower 250, and no signals appear in its output circuit. The control grid of triode 252 is connected to resistor 264 over a potentiometer connection 253 and a condenser 278. When tridoe 254 is rendered more conductive by the incidence of the rectangular wave 268, the resulting lowering of the plate potential impressed on triode 254 is transmitted to the grid of triode 252 over potentiometer connection 253 and condenser 278. Therefore, the potential impressed on the grid of triode 252 drops down to such an extent that it is rendered non-conductive, and the plate current which has been flowing through resistor 262 ceases. This impresses ground potential on the grid of follower 248, and it is now rendered receptive for the signals impressed on its grid over condenser 277 by the output of tetrode 242. Therefore, the channel components of the selected echo signal will be passed by the follower 248, and will be impressed on a condenser 275 connected across a cathode resistor 273. A positive charge accumulates on the upper plate of condenser 275, and the resulting positive potential will be transmitted to the control grid of a direct current amplifier 278 rendering it conductive. The plate of amplifier 278 is connected to a differential winding 280 of a rotary amplifier 283, and an adjustable potentiometer type resistor 282, the potentiometer arm of which is connected over a conductor 258 to the positive terminal of bleeder resistor 256. When the rectangular wave 268 drops to zero, the cycle of the electronic switching is reversed. Condenser 267 discharges rendering triode 254 non-conductive and follower 250 conductive. At the same time triode 252 is rendered conductive because of the positive potential impressed on its grid over potentiometer connection 253 and condenser 278. This lowers the potential impressed on the grid of follower 248 with the result that follower 248 is now blocked for the signals impressed on its grid by tetrode 242. The output of follower 250 has the same elements as follower 248. Its output appears across a condenser 274, the latter being connected across a cathode resistor 272. Condenser 274 controls the transconductance of a direct current amplifier 279, the latter having the second differential field winding 281 connected in its output circuit. Rotary ampifier 283 is driven by a motor 284. When the currents in winding 280 and 281 are equal, no voltage is generated by amplifier 283. However, when the currents are unequal, a voltage of corresponding polarity appears in the output circuit of amplifier 283, and is impressed on a reversible-direct current motor 285, the speed and the direction of rotation of which corresponds to the magnitude and the polarity of the voltage generated by amplifier 283. Shaft 286 of direct current motor 285 is connected to antenna 18—20 mount so that when motor 285 turns it adjusts the angular position of the antenna in such a manner as to point it directly at the object producing the selected echo signal. The output of the direct current amplifiers 278 and 279 is shunted by an adjustable resistance 287, a fixed resistance 288 and a direct current meter 289, the latter being shunted by a condenser 290. Meter 289 being of the zero-center scale type, indicates the difference between the currents existing in the direct current amplifiers 278 and 279. The meter circuit is a high resistance circuit, and does not produce any detrimental effect on the differential field windings 280 and 281. Since this meter indicates the difference between the currents present in the field windings, it also indicates the degree as well as the direction of the antenna deviation from its on-object position. Therefore, meter 289 represents an additional means for indicating the orientation of the radio object-locating system with respect to the selected echo signal. It provides a new meter tracker for the azimuth and elevation operators, and it furnishes to the operators the necessary information in a form of an even flow of data on the relative position of the single echo producing object with respect to the antenna array that is under the operator's control.

*Adjustment of the automatic tracker*

Transmitter 14 and receiver 26, Fig. 1, are started and put in operation.

With the switches 291, 292, 293 and 294 open, and switches 295 and 296 closed, the sliding contact adjustment between potentiometer 282 and conductor 258 is adjusted so that meter 289 reads zero. Switches 295—296 are then opened, and if meter 289 does not remain on zero, potentiometer 297 is adjusted so that it returns again to its zero-center position. The adjustments of the potentiometers 282 and 297 results in a preliminary balancing of the direct current amplifiers 278 and 279.

The second adjustment is concerned with the equalization of the output of the followers 248 and 250. With the switches 298, 293 closed, and switches 291, 292, 295, 296 and 294 open, a sinusoidal wave or any other signal of proper intensity is impressed on the control grid of tetrode 236 to render it periodically conductive. If meter 289 does not remain on zero, it means that the parallel channels of the tracker are unbalanced. Meter 289 my be restored to zero by adjusting potentiometer 253. The latter adjustment will have an effect on the proper setting of potentiometer 297, and it may become necessary to readjust it.

With the switches 292 and 298 closed and the switches 291, 293, 294, 295, 296 open, the automatic tracker is connected to the receiver, and the receiver's gain control is adjusted to its normal setting. When switch 298 is closed and switch 291 opened, the screen grid of tetrode 236 is disconnected from the echo selector pulse generator 42, Fig. 1, and the rectangular pulses 230 are no longer impressed on the screen grid of tetrode 236, but, instead, it is now connected through a resistor 235 and conductor 258 to the positive side of bleeder resistor 256. This connection impresses a normal screen grid voltage on the screen grid of tetrode 236, and the biasing potential source 299 may now be adjusted so as to produce class B amplification in tetrode 236 in a well known manner.

Adjustment of the amplitude of the rectangular wave 230 impressed on the screen grid of tetrode 236 is accomplished by measuring the amplitude of the voltage appearing across resistor 234 by means of a peak voltmeter. With the peak voltmeter connected across resistor 234, potentiometer arm 229 is adjusted until a predetermined screen grid voltage for tetrode 236 is obtained.

The next adjustment is concerned with the proper cophasing of the automatic tracker with the receiver channel. The circuits in the receiver and the automatic tracker produce different phase shifts, and these must be nullified by properly adjusting phase shifter 206, 208 in the automatic tracker so that unblocking of tetrode 236 is in phase with the appearance of the desired echo signal on the control grid of this tetrode. The cophasing adjustment is accomplished as follows: Phase shifter 34, Fig. 1, is adjusted so that the transmitted pulse appears directly under the cross hair-line on the range oscilloscope. When this adjustment is performed, switches 291, 292, 293, and 295 are closed and switches 298, 296, and 294 are opened. With the switches in the indicated positions, the upper channel of the automatic tracker is shunted by switch 295, and only the lower channel remains responsive to the signals impressed on tetrode 236. The receiver's gain is now turned down far enough to eliminate all but the transmitted pulse from the receiver's output. The phase adjusting resistance 206 is then adjusted for a maximum deflection on meter 289. When this is so, then the transmitted signal as it appears on the control grids of tetrode 236 will be in phase with the rectangular pulse 230 impressed on the screen grid of tetrode 236, since the entire transmitted signal can get through tetrode 236 only when there is a complete phase coincidence between the two signals. During this adjustment it may be found that no proper phase relationship can be obtained by adjusting resistor 206 or condenser 208. If this is the case, it means that the automatic ranger is more than 170° out of phase with the signal impressed on the control grid of tetrode 236 and operation of cophasing switch 204 becomes necessary in order to obtain a greater phase shift from the automatic tracker phase shifter.

Adjustment of the amplitude of the rectangular wave impressed on the control grid of triode 254 may be accomplished by measuring the amplitude of the voltage appearing across resistor 270. The obtained voltage reading should be sufficiently high so as to render triode 254 sufficiently conductive when the rectangular wave is on so as to block follower 250.

The outlined adjustments do not necessarily put the automatic tracker in an optimum operating condition, since, as it will be understood by those skilled in the art, some of the enumerated adjustments are bound to have the unbalancing effect on the adjustments which preceded them. For example, the adjustment of the amplitude of the rectangular wave impressed on the grid of triode 254 may affect the balanced condition of the rectifiers and direct current amplifiers connected to triodes 254 and 252, and, after the adjustment of the amplitude of the rectangular wave, it may be found that the previous adjustments will require additional going over before the optimum operating conditions are obtained. The adjustments outlined above can be made either in the field or on the bench, while the radio receiver is being aligned. Once the automatic tracker is adjusted in connection with any particular transmitter-receiver combination, it should normally remain in a balanced and cophased condition, and ready for an instantaneous use on any subsequent occasion without any preliminary adjustments.

Summary of the operation of the automatic tracker

Since the operation of the automatic tracker has been already described in detail in connection with the description of its circuits, only a summary of its operating cycles will suffice in order to complete its disclosure. Two alternating series of signals are impressed on the automatic tracker by the receiver, one series of signals originating in one lobe of the antenna array, and the other series originating in the other lobe of the same antenna array. These signals are shown at 36 and 37 in Fig. 1. The signals from the two receiver channels are impressed on the echo selector tube 236 where all signals, except the echo signal selected by the range operator, are suppressed. In order to obtain the selection of the desired echo signal, the sinusoidal wave as it appears in the output circuit of the range unit 34 is impressed on the echo selecting pulse generator 42, Fig. 1, which transforms this sinusoidal wave into a series of rectangular pulses 230, Fig. 2, which are impressed on the screen grid of the echo selector tube 236 in synchronism and simultaneously with the appearance of the desired echo signal on the control grid of the same tube. The coincidence of the rectangular pulse 230 with the desired echo signal in the echo selector 236 changes its transconductance so that it acts as an amplifier of the selected echo signal. Because of the double-tracking method used in the receiver, the selected signal appears in the output circuit of the echo selector 236 as a series of the channel component signals, first from one antenna lobe, and then from the other antenna lobe, as illustrated at 245 and 246, Fig. 2. The components from different channels are separated in the automatic tracker by means of an electronic switch which is composed of triodes 252, 254, and followers 248 and 250. Triodes 252 and 254 are connected to a lobe switcher which renders them alternately conductive and non-conductive coincident with the appearance of the channel components of the selected echo signal in the respective output circuits of the amplifier tubes 242 and 244. Triodes 252 and 254 in turn control the transconductance of followers 248 and 250 in such a manner that these followers become alternately blocked, which results in the separation of the channel components and the appearance of only one channel component of the selected echo signal illustrated at 248' in the output of follower 248 and the appearance of only the other channel component illustrated at 250' in the output circuit of follower 250. The separated channel components 248' and 250' are impressed on the two resistance-condenser combinations 273—275 and 272—274, the values of these resistance-condenser combinations being such that the voltage appearing across each condenser is approximately equal to the peak voltage values of the respective channel components of the selected echo signal. These voltages are impressed on the two direct current amplifiers 278 and 279, the plate circuits of which are connected to the differential field windings 280 and 281 of rotary amplifier 283. The resultant flux produced by these windings generates a voltage of the corresponding polarity, which is impressed on reversible-direct current motor 285, shaft 286 of which is connected to the mount of antenna array 18—20. When antenna array 18—20 does not point directly at the object producing the selected echo signal, the channel components of the echo signal have unequal amplitudes, which exhibits itself in the generation of voltage of proper polarity and magnitude by rotary amplifier 283. This voltage is impressed on the reversible motor 285, which turns the antenna mount in such a direction as to point it directly at the object producing the echo signal. This nullifies the difference in the amplitude of the channel components of the selected echo signal, and restores the balanced condition of the two parallel channels in the automatic tracker so that amplifier 283 ceases to generate any voltage, which stops the rotation of the reversible-direct current motor 285.

To conclude the description of the operation of the system of automatic tracker, it may be added that it should be disconnected so long as there is a preliminary orientation of the entrie system with respect to any given signal. This ordinarily takes place when the operator of the range unit chooses the desired echo signal from the plurality of the echo signals ordinarily present on the screen of the range oscilloscope. When this takes place, the azimuth and the elevation antenna arrays may form such a large angle with respect to the selected echo signal that an immediate connection of the automatic tracker may result in overloading of the automatic tracker, and especially its driving equipment together with the mechanical connections between the driving equipment and the antenna mount itself. To avoid this, switch 294 should remain open and the automatic tracker disconnected until a fair degree of on-object orientation of the antenna array has been obtained. At this stage, switch 294 may be closed, and the entire control over tracking transferred to the automatic trackers which will track the selected object in azimuth and in elevation from that instant. The rotary amplifiers may be protected with the well-known overload relays. As protective systems of this kind are well known, they are not shown in the drawings.

Figure 3 illustrates another form of phase shifter 40 and echo selecting pulse generator 42, Fig. 1, which, as it may be recalled, are used for generating the echo selecting pulse for the echo selector 47. Referring to the upper left corner of Fig. 3, conductor 43 shown in Fig. 1 is also shown in Fig. 3. It connects the sinusoidal wave output of range unit 34 to the primary of a transformer 301, the secondary winding of which is connected to the top and bottom corners of an R.-C. bridge made up of resistors 302, 304 and condensers 306, 308. Potentiometer resistors 310 and 312 are connected to the top and bottom corners of the bridge, and to the poles of a double-pole double-throw switch 314. The contacts of the switch are connected to the left and right hand corners of the bridge as shown.

Assuming that the poles of switch 314 are thrown to the right, potentiometer 310 is connected in shunt around condenser 308. The movable contacts 315 and 313 of potentiometer 312 and 310 are mechanically connected for simultaneous movement by being arranged on a common shaft. This mechanical connection is schematically illustrated by a broken line connection 316 on the diagram. It will be evident that when contacts 315 and 313 are moved all the way to the right, the output is taken at the left and right corners of the bridge, resulting in a substantial phase shift relative to the phase of the top and bottom corners of the bridge. As the contacts are moved back in the opposite directions, the effect of the capacity phase shift is lessened until finally when contacts 315 and 313 are moved all the way to the left, there is no change in phase at all, the connections being to the top and bottom of the bridge and the secondary winding of transformer 301. By throwing the switch 314 to the left, the potentiometers are connected in shunt with resistors 302 and 304 of the bridge, instead of the condensers, thus providing a further range of phase shift.

The sine wave output from the phase shifting bridge is applied to a class-A amplifier 317, which amplifies the sinusoidal wave and impresses the same through a transformer 318 on the control grid of an overdriven amplifier tube 320, thus transforming the sinusoidal wave input illustrated at 319 into a wave form illustrated at 321. This wave is impressed on an adjustable condenser-resistance combination 322—323, which has such a time constant that the wave illustrated at 321 is transformed into a series of sharp pulses of positive and negative signs illustrated at 324. Since the sharpness or width of the pulses illustrated at 324 depends on the time constant of the R.-C. circuit, and since this circuit is made adjustable, the width of the positive and negative pulses may be varied by making either condenser 322 or resistor 323 settings such as to either increase or decrease the time constant of this circuit. This adjustment produces the desired width control over the rectangular pulses illustrated at 230 in Fig. 2, and at 330 in Fig. 3. The positive and negative pulses illustrated at 324 are impressed on an overdriven class B or C amplifier tube 326, which transforms the positive pulses into a series of rectangular voltage pulses illustrated at 327. These negative pulses are impressed on a class A amplifier tube 328, which transforms them into a series of rectangular pulses 330, which correspond to the rectangular pulses 230, in Fig. 2. As in case of Fig. 2, these pulses are used for changing the transconductance of tetrode 236, Fig. 2, by impressing them on the screen grid of that tetrode. Comparison of Figs. 2 and 3 reveals that the same result, i. e., a series of echo selecting pulses 230, Fig. 2, and 330, Fig. 3, is generated in either case, and in either case the phase, the width, and the amplitude of these pulses may be adjusted to the desired degree. In the case of Fig. 2, the fine phase adjustments are accomplished by varying the settings of the resistance-condenser combination 206—208, while in the case of Fig. 3, the same is accomplished by varying the settings of the potentiometer arms 313 and 315. Also, while in Fig. 2 the width of the rectangular pulse is varied by varying the setting of inductance 223, the same is accomplished in Fig. 3 by varying the setting of condenser 322 and resistance 323. In both cases the amplitude of the rectangular pulse is adjusted by varying the setting of the potentiometer arms 229, Fig. 2, and 329, Fig. 3.

Figure 4 illustrates another form of power amplifier which may be used in connection with the automatic tracker illustrated in Fig. 2. In this figure, direct current amplifier tubes 278 and 279 correspond to the same tubes illustrated in Fig. 2. In this case the outputs of these tubes are connected to a differential polarized relay 400, the armature 402 of which is normally kept in a neutral position by springs 404 and 406. The output of tube 278 is impressed on the upper coil 410 of the relay, while the output of tube 279 is impressed on the lower coil 412. Depending upon the conductivity of the tubes, relay 400 remains in a neutral position when the plate currents are equal, and energized either to the left or right position when the conductivity of one tube predominates the conductivity of the other. Energization of relay 400 connects one end of its armature either to a positive source of potential 416, or a source of negative potential 412, the other end being connected to a reversible-direct current motor 420, shaft 422 of which corresponds to shaft 62 illustrated in Fig. 1, and shaft 286 illustrated in Fig. 2. When direct current motor 420 revolves in either one direction or the other, it orients the antenna array so that it points directly at the object producing the echo signal. This equalizes the currents in the amplifier tubes 278 and 279, with the resulting de-energization of relay 400, which stops motor 420.

It should be noted that while in the majority of the instances I have shown simple triodes in the wiring diagrams of Figs. 2 and 3, in actual practice the tubes will ordinarily be pentodes or other multiple electrode tubes, having greater efficiency for work with the video frequency pulses here contemplated. Moreover, while I have shown two power amplifying means, one in Fig. 2 corresponding to an "amplidyne" set, and another in Fig. 4, which uses a relay and a reversible-direct current motor, there are now available several other types of power amplifiers which are equally suitable for accomplishing the contemplated result.

The advantages of the automatic tracker described in this specification may be summarized as follows: It enables one to operate radio object-locating systems with a greater degree of precision than the precision that is obtainable when they are operated manually. The automatic tracker may be very readily connected and disconnected from the radio object-locating systems without disrupting their normal functioning cycle either before or after the disconnection of the automatic tracker. All circuits are of entirely electronic nature which use vacuum tubes, and the only mechanical elements that are used by the tracker relate to the driving equipment. Therefore, the circuits may be adjusted to a high degree of precision, which will be maintained throughout the normal functioning cycle and life of the equipment.

It is believed that the construction and operation of my automatic tracking system as well as the many advantages thereof will be apparent from the foregoing description. It will, therefore, be apparent that while I have shown and described my invention in several preferred forms, many changes and modifications may be made without departing from the spirit of the invention, is sought to be defined in the following claims.

I claim:

1. A radio pulse echo object locating system capable of comparing components of an echo signal derived through separate receiving channels comprising means for alternately receiving signals first over one channel and then over the other channel, means for suppressing all but the desired echo signal, means for separating the components of said desired echo signal according to the derivative channels of said components and means for comparing the magnitude of said components said means for separating said components of said desired echo signal according to the derivative channels of said components comprising two parallel amplifiers, a source of rectangular pulses, and an electronic switch connected between said source and said amplifiers for alternately blocking and unblocking said amplifiers for the duration of and simultaneously with the appearance of the respective channel components of said desired echo signal in said amplifiers, whereby the component derived through one of said receiving channels appears in one amplifier, and the component derived through the other receiving channel appears in the other amplifier.

2. A radio pulse echo object locating system capable of comparing components of an echo signal derived through separate receiving channels comprising means for alternately receiving signals first over one channel and then over the other channel, means for suppressing all but the desired echo signal, means for separating the components of said desired echo signal according to the derivative channels of said components and means for comparing the magnitude of said components said means for separating said components of said signal according to the derivative channels of said components comprising two parallel vacuum tube amplifiers, a first set of connections between the control grids of said amplifiers and said second means, a second set of connections between said control grids and two sources of keying voltages respectively, said keying voltages being 180° out of phase and rendering said amplifiers alternately blocked and unblocked for the duration of and simultaneously with the appearance of the respective channel components of said desired echo signal on said control grids, thereby separating the channel components of said desired echo signal in said amplifiers.

3. A radio pulse echo object locating system capable of comparing components of an echo signal derived through separate receiving channels comprising means for alternately receiving signals first over one channel and then over the other channel, means for suppressing all but the desired echo signal, means for separating the components of said desired echo signal according to the derivative channels of said components and means for comparing the magnitude of said components said means for comparing the magnitude of said components comprising two grid-controlled thermionic elements connected to said third means, resistance-condenser combinations in the output circuits of each of said thermionic elements for integrating the output of each of said thermionic elements, two direct current amplifiers connected to said resistance-condenser combinations respectively, and a differential field winding of a power amplifier connected in an output circuit of each of said amplifiers, said power amplifier generating a voltage proportional to a difference between the peak voltage values of said components.

4. In a radio pulse-echo object-locating system capable of automatically tracking an object producing an echo signal, a two lobe antenna array with two output circuits; two radio frequency receiving channels connected to said output circuits respectively; a lobe switching unit connected to said radio frequency receiving channels, said lobe switching unit alternately keying said radio frequency channels; a heterodyne receiver connected to said channels, said receiver alternately receiving signals first from one radio frequency channel and then from the other radio frequency channel; means connected to a video output of said receiver for suppressing all but the echo signal produced by said object; means, connected to said first means, for separating the components of said desired echo signal according to the derivative channels of said components; means, connected to said second means, for amplifying and deriving the difference in magnitude of said lobe components; and means, connected to said last means, for utilizing said difference for automatically pointing the mean lobe axis of said antenna array at the source of said signals.

5. An electronic switch comprising a first condenser-resistance coupled stage, a second condenser-resistance coupled stage, said stages forming two parallel channels connected to a common source of signals, and an electronic switch connected to said first and second stages, said electronic switch comprising a first thermionic element the output of which is directly connected to the control element of said first stage, and a second thermionic element the output of which is directly connected to the control element of said second stage, the control grid of one of said thermionic elements being so coupled to the output circuit of the second thermionic element that one or the other thermionic element is conductive in alternation, and means to apply a control wave to the control grid of said second thermionic element, whereby said control wave periodically renders one stage non-conductive and the other stage conductive.

6. An electronic switch as defined in claim 5, in which said first thermionic element further comprises a grid-controlled vacuum tube, a source of keying signals connected to the control grid of said tube and rendering said tube alternately conductive and non-conductive, and said second thermionic element comprises a second grid-controlled vacuum tube, the control grid of said second tube being connected to the output circuit of said first thermionic element whereby when said first thermionic element is rendered conductive by said source of keying signals, said second element is rendered non-conductive.

JAMES R. MOORE.

REFERENCES CITED

The following references are of record in the file of this patent:

UNITED STATES PATENTS

| Number | Name | Date |
|---|---|---|
| 2,063,534 | Wallace | Dec. 8, 1936 |
| 2,257,757 | Moseley | Oct. 7, 1941 |
| 2,308,521 | Lear | Jan. 19, 1943 |
| 2,409,448 | Rost | Oct. 15, 1946 |
| 2,409,462 | Zworykin | Oct. 15, 1946 |
| 2,412,612 | Godet | Dec. 17, 1946 |
| 2,427,029 | Stearns | Sept. 9, 1947 |